UNITED STATES PATENT OFFICE.

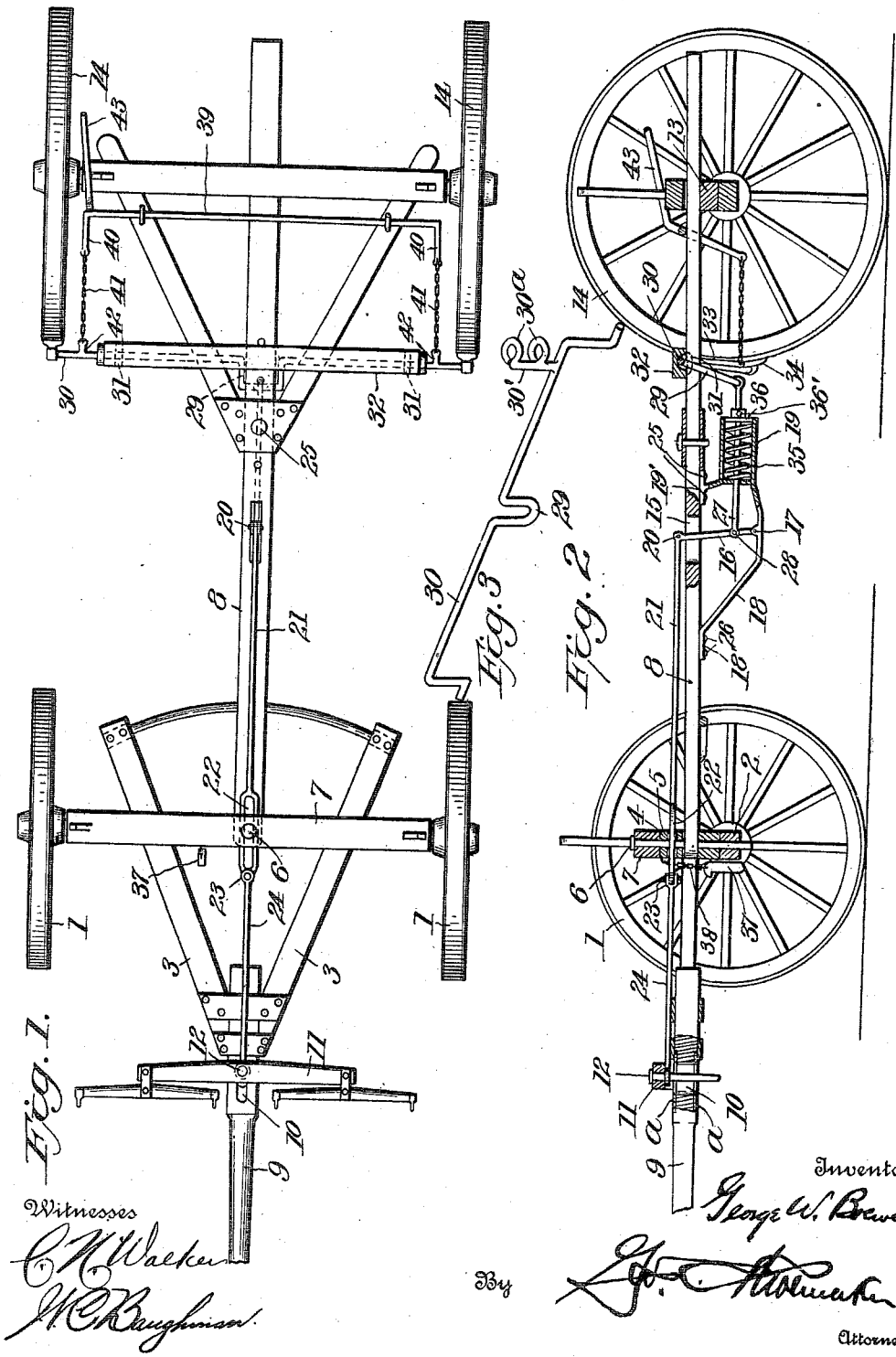

GEORGE W. BREWER, OF ADD, KENTUCKY.

AUTOMATIC WAGON-BRAKE.

972,808. Specification of Letters Patent. Patented Oct. 18, 1910.

Application filed January 4, 1910. Serial No. 536,347.

*To all whom it may concern:*

Be it known that I, GEORGE W. BREWER, a citizen of the United States, residing at Add, in the county of Laurel and State of Kentucky, have invented certain new and useful Improvements in Automatic Wagon-Brakes, of which the following is a specification.

This invention relates to automatic vehicle brakes.

One object of the invention is to provide a simple, inexpensive, durable and efficient brake mechanism applicable to vehicles of various kinds for the purpose of automatically applying the brakes to the wheels of vehicles when the vehicles are brought to a state of rest.

Another object of the invention is to provide a brake mechanism of the character stated embodying such characteristics that the brake shoes will be released from engagement with the wheels when the animals are pulling the vehicle and automatically applied to the wheels the moment that the vehicle is brought to a state of rest.

A still further object of the invention is to provide a brake mechanism which may be applied automatically or manually and which may be thrown out of automatic operation, if desired.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a plan view of a vehicle illustrating my invention applied thereto. Fig. 2 is a longitudinal sectional view, certain parts being shown in elevation. Fig. 3 is a perspective view of a modified form of brake rod.

Referring now more particularly to the accompanying drawings, the reference character 1 indicates the front wheels, 2 the front axle, 3 the front hounds, 4 a sand bar provided with a slot 5, and 6 a king bolt passed through the front bolster 7, the sand bar 4, the axle 2 and the reach bar 8, there being a tongue 9 fixedly secured to the front hounds 3 and provided with a slot 10 in which is mounted the doubletree 11 by means of the pivot bolt 12.

The reach bar 8 is connected up with the rear sand bar 13 of the rear wheels 14 in any suitable manner and has intermediate its ends a slot 15 through which slot extends an upwardlly directed lever 16 pivoted at 17 to the leg 18 of the casing 19 and at the upper end of this lever 16 there is pivoted at 20 a link 21 having a slot 22 adapted to slidably embrace the king bolt 6 and its slotted end pivoted at 23 to a link 24 which is connected to the aforesaid pivot bolt 12 of the doubletree, there being wear plates *a* secured in any suitable manner to the tongue 9 and slotted to correspond with the opening 10 so that the pivot bolt 12 will engage the wear plates and not cause undue wear upon the wooden tongue 9 during the backward and forward movement of the pivot bolt 12, for a purpose hereinafter explained.

The casing 19 is secured to the reach bar 8 in any suitable manner, one means of securing it being to connect the supporting bar 19′ of the casing to the reach bar, as shown at 25, and to connect the foot 18′ of the leg 18 to the underside of the reach bar by means of suitable fastenings 26.

Slidably mounted through the casing 19 is a rod 27 which at one end has pivotal connection at 28 with the aforesaid lever 16 and at its opposite end pivotally connected to the arm 29 of the brake rod 30, which latter is swingingly mounted in the bearings 31 of the brake beam 32, the latter being secured upon the upper faces of the rear hounds 38 in any suitable manner, and being provided with a longitudinal cavity for the reception of the brake rod 30, said brake rod 30 working in said cavity between the brake beam 32 and the rear hounds 38, as clearly shown in Fig. 2.

In one form of invention the brake rod 30 is provided with the downwardly directed arms 33 at the free ends of which are secured the brake shoes 34 which are held out of contact with the rear wheels when the double-tree is pulled forwardly during the travel of the horses, there being a spring 35 mounted in the aforesaid casing 19 and bearing at one end against the front end of the casing and at its opposite end against the collar 36 adjustably secured to the rod 37 by means of the set screw 36′. This set screw 36′ permits of a tensioning of the spring 35 incident to adjustment of the collar 36 on the rod 27. Thus when the horses pull the vehicle they cause a forward sliding movement of the doubletree 11 in the slot 10 with a consequent forward pulling action upon the lever 16, which draws the rod 27 forwardly, causing compression of the spring 35 between the front end of the casing and the collar 36, and the rod 27 being connected with the crank arm 29, the pulling action upon the latter causes the arms 33 to swing away from the rear wheels 14 and move the brake shoes 34 away from engagement with the latter. If the horses should stop pulling on the doubletree or should attempt to back the vehicle, the action of the levers, links and rods would be the reverse and would result in the application of the brake shoes 34 to the rear wheels, because the spring 35 would immediately expand and cause an automatic application of the brake shoes 34 to the rear wheels 14.

To prevent the automatic application of the brake shoes 34 to the rear wheels, I provide a latch pin 37 which may be dropped into the slot 22 of the link 21 and prevent such rearward sliding movement of the link 21 as to result in the automatic application of the brake shoes to the rear wheels. This latch pin 37 may be secured to a chain 38 secured in any suitable manner to the bolster or the sand bar or other part of the running gear.

There may be times when it may be desired to apply the brake shoes to the rear wheels manually, and for this reason I provide a brake rod 39 having legs 40 to which I connect chains 41 leading to the arms 42 of the brake rod 30. To this supplemental brake rod 39 I connect a lever 43 which may be operated to swing the supplemental brake rod 39 so as to throw the brake shoes 34 manually into engagement with the rear wheels 14, the latch pin 37, of course, not being disposed in the slot 22 of the rod 21. Obviously this supplemental brake rod 39 may be disposed beneath the hounds 38 instead of on top of them, as shown, and it is also obvious that but one chain 41 need necessarily be employed, in which event the chain 41 would extend from the supplemental rod 39 intermediate its ends to the crank arm 29. This appears too obvious for illustration. Moreover, instead of employing any chains at all, or even a supplemental brake rod 39 I may provide the brake rod 30 with an arm 30′ provided with eyes 30ª adapted to receive a stick or other implement (not shown) to swing the brake rod 30 for the purpose of applying the brakes manually.

What is claimed is:—

1. The combination of a running gear, a brake rod mounted on the same and provided with brake shoes arranged to engage the rear wheels, a tongue connected to the running gear, a doubletree mounted to slide on the tongue, a casing secured to the reach bar of the running gear and provided with a slot, a lever pivotally connected to the casing and extending through the opening of the reach bar, a slotted link pivotally connected at one end to said lever, a link pivotally connected to the slotted link and having connection with the doubletree, and a spring pressed rod pivotally connected to said lever and to said brake rod.

2. The combination of a running gear, a brake rod mounted on the same and provided with brake shoes arranged to engage the rear wheels, a tongue connected to the running gear, a doubletree mounted to slide on the tongue, a casing secured to the reach bar of the running gear and provided with a slot, a casing secured to the reach bar, a lever pivotally connected to the casing and extending through the opening of the reach bar, a slotted link pivotally connected at one end to said lever, a link pivotally connected to the slotted link and having connection with the doubletree, a spring pressed rod pivotally connected to said lever and to said brake rod, and a latch bolt carried by the running gear and adapted to be inserted in the slot of said slotted link to prevent sliding movement of the slotted link.

3. The combination with a running gear, including a slotted reach bar, a slotted sand bar, a king bolt passed through the sand bar, a tongue secured to the running gear and provided with a slot, a doubletree mounted on the tongue, a bolt passed through the doubletree and the slot of the tongue to permit backward and forward movement of the doubletree on the tongue, a casing secured to the reach bar, a lever pivoted to the casing and extending through the slot of the reach bar, a link pivoted at one end to said lever and at its opposite end passed through the slot of the sand bar and slidably embracing the king bolt, a link pivotally secured to the slotted end of the slotted link and also having pivotal connection with the bolt passed through the doubletree, a brake beam, a brake rod swingingly connected to the brake beam and having downwardly extending arms at its end, and at the extremities thereof carrying the brake shoes for application to the rear wheels, the brake rod having an arm intermediate its ends, a link connected to the last mentioned arm and to the aforesaid lever and having a collar intermediate its ends, and a spring confined in the aforesaid casing between said collar and one end of the casing to hold the brake shoes normally in engagement with the rear wheels whereby the brake shoes may be applied to the wheels automatically and released therefrom upon a forward pulling action upon the doubletree of the vehicle.

4. The combination with a running gear, including a slotted reach bar, a slotted sand bar, a king bolt passed through the sand bar, a tongue secured to the running gear and provided with a slot, a doubletree mounted on the tongue, a bolt passed through the doubletree and the slot of the tongue to permit backward and forward movement of the doubletree on the tongue, a casing secured to the reach bar, a lever pivoted to the casing and extending through the slot of the reach bar, a link pivoted at one end to said lever and at its opposite end passed through the slot of the sand bar and slidably embracing the king bolt, a link pivotally secured to the slotted end of the slotted link and also having pivotal connection with the bolt passing through the doubletree, a brake beam, a brake rod swingingly connected to the brake beam and having downwardly extending arms at its ends and at the extremities thereof carrying the brake shoes for application to the rear wheels, the brake rod having a crank arm intermediate its ends, a link connected to the last mentioned arm and to the aforesaid lever and having a collar intermediate its ends, a spring confined in the aforesaid casing between said collar and one end of the casing, to hold the brake shoes normally in engagement with the rear wheels whereby the brake shoes may be applied to the wheels automatically, and means whereby the brake shoes may be applied to the wheels manually.

5. The combination with a running gear, including a slotted reach bar, a slotted sand bar, a king bolt passed through the sand bar, a tongue secured to the running gear and provided with a slot, a doubletree mounted on the tongue, a bolt passed through the doubletree and the slot of the tongue to permit backward and forward movement of the doubletree on the tongue, a casing secured to the reach bar, a lever pivoted to the casing and extending through the slot of the reach bar, a link pivoted at one end to said lever and at its opposite end passed through the slot of the sand bar and slidably embracing the king bolt, a link pivotally secured to the slotted end of the slotted link and also having pivotal connection with the bolt passing through the doubletree, a brake beam, a brake rod swingingly connected to the brake beam and having downwardly extending arms at its ends and at the extremities thereof carrying the brake shoes for application to the rear wheels, the brake rod having an arm intermediate its ends, a link connected to the last mentioned arm and to the aforesaid lever and having a collar intermediate its ends, a spring confined in the aforesaid casing between said collar and one end of the casing to hold the brake shoes normally in engagement with the rear wheels whereby the brake shoes may be applied to the wheels automatically, and a latch bolt carried by the running gear and adapted to be inserted in the slot of the slotted link to prevent automatic operation of the brake.

6. The combination with a running gear, including a slotted reach bar, a slotted sand bar, a king bolt passed through the sand bar, a tongue secured to the running gear and provided with a slot, a doubletree mounted on the tongue, a bolt passed through the doubletree and the slot of the tongue to permit backward and forward movement of the doubletree on the tongue, a casing secured to the reach bar, a lever pivoted to the casing and extending through the slot of the reach bar, a link pivoted at one end to said lever and at its opposite end passed through the slot of the sand bar and slidably embracing the king bolt, a link pivotally secured to the slotted end of the slotted link and also having pivotal connection with the bolt passed through the doubletree, a brake beam, a brake rod swingingly connected to the brake beam and having downwardly extending arms at its ends and at the extremities thereof carrying the brake shoes for application to the rear wheels, the brake rod having an arm intermediate its ends, a link connected to the last mentioned arm and to the aforesaid lever and having a collar intermediate its ends, a spring confined in the aforesaid casing between said collar and one end of the casing, to hold the brake shoes normally in engagement with the rear wheels, whereby the brake shoes may be applied to the wheels automatically, means whereby the brake shoes may be applied to the wheels manually, and a latch bolt carried by the running gear and adapted to be inserted in the slot of the slotted link to prevent automatic operation of the brake.

In testimony whereof I affix my signature in presence of two witnesses.

GEORGE W. BREWER.

Witnesses:
R. P. YOUNG,
J. M. YOUNG.